May 5, 1959     W. V. BOWEN     2,885,069
CONVEYOR BELT CLEANING APPARATUS
Filed Nov. 19, 1954     4 Sheets-Sheet 1

INVENTOR.
WILLIAM V. BOWEN

May 5, 1959  W. V. BOWEN  2,885,069
CONVEYOR BELT CLEANING APPARATUS
Filed Nov. 19, 1954  4 Sheets-Sheet 2

INVENTOR.
WILLIAM V. BOWEN
BY
Watson, Cole, Grindle &
Watson

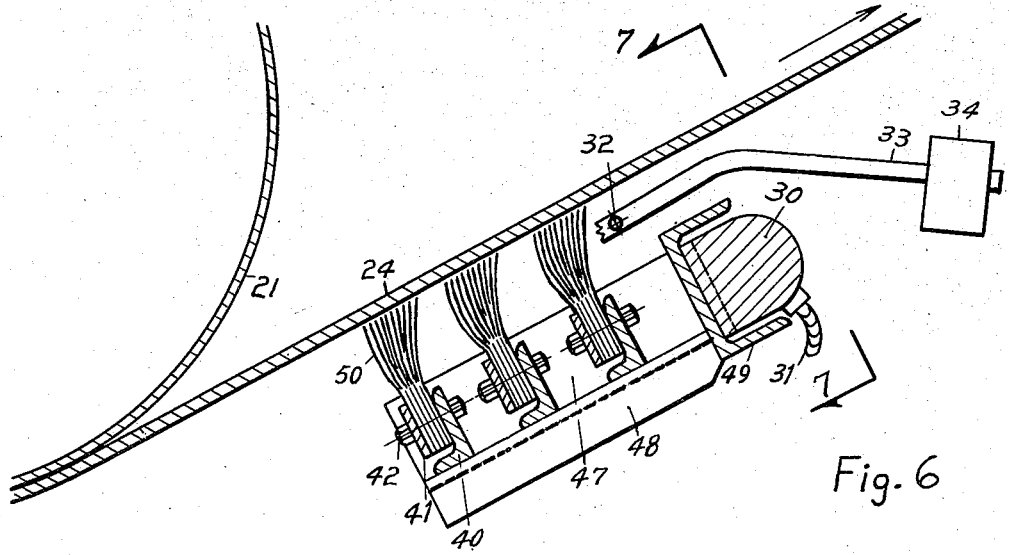
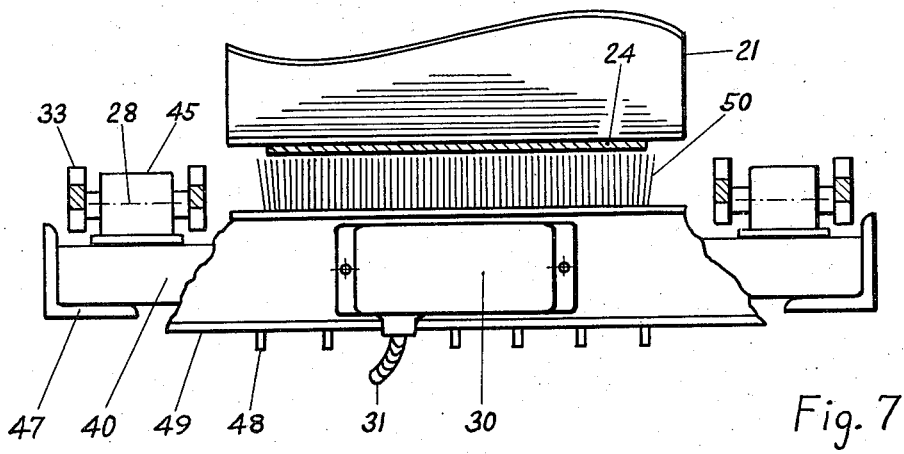

United States Patent Office 2,885,069
Patented May 5, 1959

2,885,069
CONVEYOR BELT CLEANING APPARATUS

William V. Bowen, Baltimore, Md.

Application November 19, 1954, Serial No. 470,033

10 Claims. (Cl. 198—230)

The present invention relates to a novel means of removing residual substance from the surface of bulk material conveyor belts.

In the present novel embodiment, there is provided a device to contact the surface of the belt and a means to vibrate or oscillate this contacting device.

The device used to contact the belt surface may be a scraper of metal, nylon, rubber or other suitable material, or it may be a brush of metal, nylon, organic fiber, or other suitable material. The device in contact with the belt is caused to vibrate or oscillate by means of an electric vibrator or other suitable mechanical oscillating or reciprocating mechanism. The rapid vibration or oscillation of the device contacting the belt surface loosens the material adhering to the belt causing its more complete removal with greater ease and less abrasion and erosion of the equipment.

It is, therefore, an important object of the present invention to provide a vibrating or oscillating mechanism to impart a rapid reciprocating motion to the device used to scrape or brush the belt surface.

My invention will be more fully understood and further objects and advantages thereof will become apparent when reference is made to the more detailed description thereof which is to follow and to the accompanying drawings, in which:

Fig. 6 is a sectional elevational view of another modification of the apparatus and arrangement thereof;

Fig. 7 is a sectional view taken along line 7—7 on Fig. 6;

Figure 1:
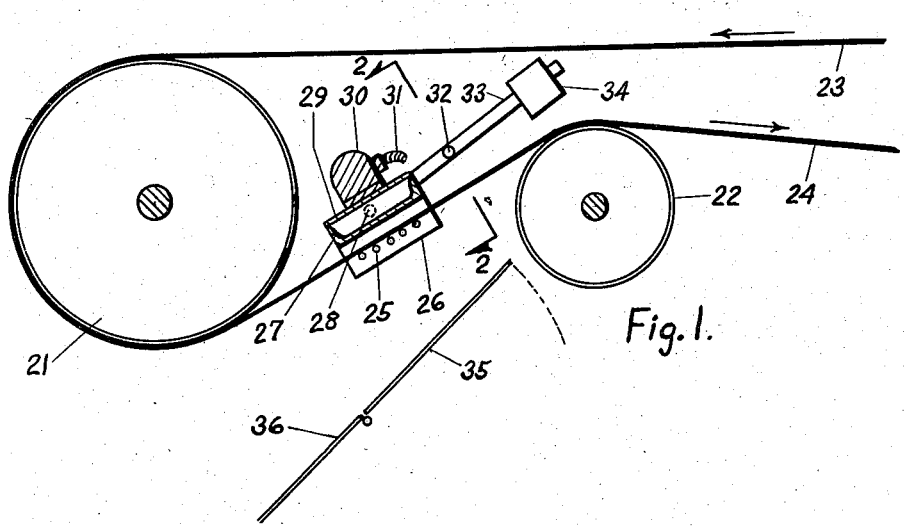
Fig. 1 is a diagrammatic sectional elevational view illustrating the arrangement of the belt cleaning device.

Referring now to the drawings and to Fig. 1, the bulk load carrying conveyor belt carrying side 23, passes over head drive pulley 21 discharging its bulk load into hopper 36. The empty return belt 24 usually does not discharge all of he bulk load but some percentage adheres to the belt surface and it is very desirable to remove most of this residual carry over to avoid its compression into the belt surface by snub pulley 22, also to avoid a built-up layer of this carry over material onto the snub pulley face 22 and onto face of return idlers not shown, and to avoid drippage of material along the return path of the conveyor. The belt cleaning device is, therefore, usually placed along the return belt 24 immediately following the head pulley 21 and ahead of snub pulley 22. This allows the carry over material that is removed from the belt by the cleaning device to drop into the main discharge hopper 36. Alloy steel tension wires 25 contact the return belt and scrapes off the residual material adhering to belt 24. Wires 25 are stretched taut by supporting frame members 26 and 27. The belt cleaning assembly is supported by shafts 28 through a rubber cushion vibration dampener not shown to lever arms 33 which in turn are pivoted at 32. Counterweight 34 maintains a light contact pressure between tension wires 25 and belt 24. Electric vibrator 30 is bolted to base plate 29 to transmit a rapid vibration to frame members 27 and 26 and then to tension wires 25 through connectors 37. Electric power is supplied through conduit 31. The rapid vibration of tension wires 25 breaks loose the residual layer of material on conveyor belt 24 largely eliminating the abrasion of conveyor belt 24 and the erosion of tension wires 25. Inspection door 35 in hopper casing 36 permits inspection, adjustment and maintenance of the apparatus.

Figure 2:
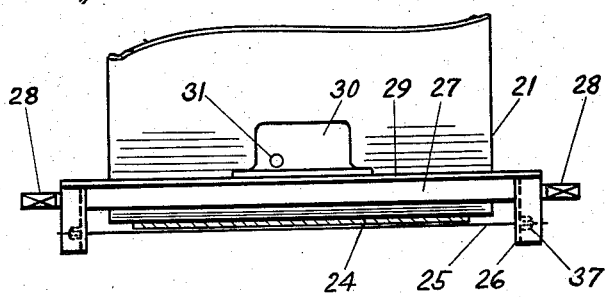
Fig. 2 is a sectional view taken along line 2—2 on Fig. 1.

Fig. 2 is a sectional view of the device shown in Fig. 1. The position of the vibration producing device 30 is shown mounted central on channel steel supporting frame 27. It is to be understood that the vibrating unit may be located at several other locations all imparting vibrating energy to tension wires 25. The complete belt cleaning assembly is supported at 28 at both sides, each side having lever arm 33 and counterweight 34. This detail is shown more completely in the following figures.

Figure 3:
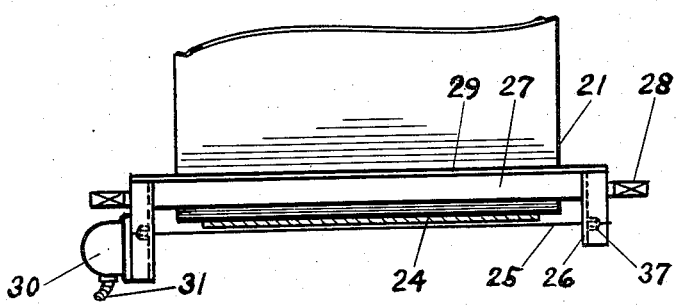
Fig. 3 is a sectional view similar to Fig. 2 of a modified arrangement of the apparatus.

Fig. 3 is a sectional view similar to Fig. 2 showing an alternate location of vibrator 30.

Figure 4:
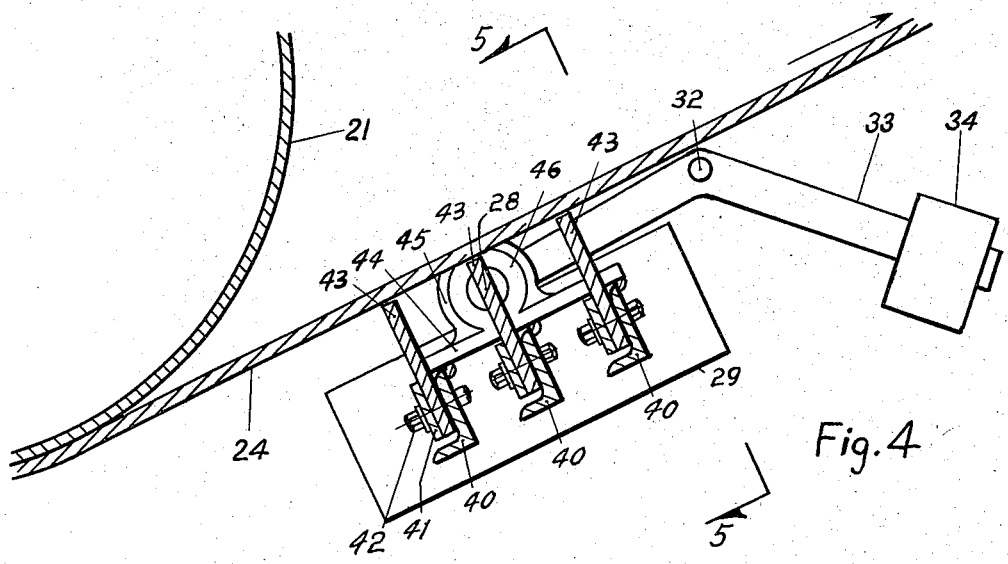
Fig. 4 is a sectional elevational view of a modification of the apparatus and arrangement thereof.

Fig. 4 is a somewhat enlarged sectional view of a modified belt cleaning device incorporating multiple parallel scrapers 43 installed crosswise of belt 24. Scrapers 43 may be of rubber, nylon, metal or other materials clamped rigidly to structural steel angles 40 by plates 41 and bolted connections 42. The tips of scrapers 43 contact belt surface 24 to remove residual carry over material from belt 24. The belt cleaning assembly is supported by shafts 28 through vibration dampener material 46 to housing 45 and base 44 to cross members 40. Lever arms 33 are fastened to ends of shafts 28 to fixed pivot point 32 with counterweight 34 to maintain a light pressure of scrapers 43 against the underside of belt 24. Mounting plate 29 is bolted to vibrator 30 and welded to members 40 so that vibration is transmitted to scrapers 43. The vibrator may be positioned at several different points to transmit vibratory motion either parallel to the scrapers as shown in Fig. 4 or parallel to the direction of belt travel as shown in Fig. 6, or perpendicular to and against the belt surface such as shown in Fig. 1 and Fig. 2 or at other angular relations thereto all within the scope of this invention. The vibratory motion breaks loose the material adhering to the belt largely eliminating the belt abrasion and scraper erosion.

Figure 5:
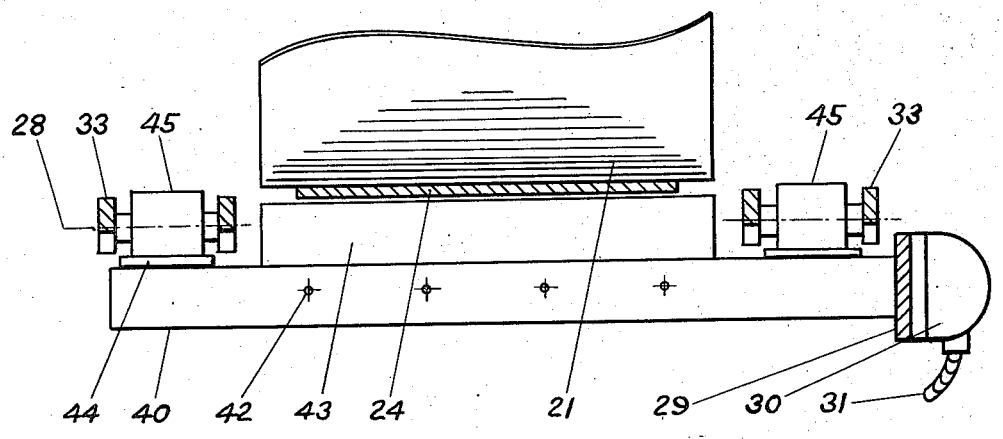
Fig. 5 is a sectional view taken along line 5—5 of Fig. 4.

Fig. 5 is a sectional view of the device shown in Fig. 4 and indicates the vibratory power unit 30 positioned at the end of members 40 to transmit vibratory motion parallel to scrapers 43.

Fig. 6 is similar to Fig. 4 with the exception that instead of scrapers 43 parallel brushes 50 are used. The brush material may be nylon, alloy steel, non-ferrous metal, of other suitable material. Angles 40 are supported on angles 47 and flat bars 48 which in turn are welded to ship channel 49 on which is mounted vibrator 30. Vibratory motion is thus transmitted to brushes 50 parallel to the direction of belt travel. The vibrating unit may be mounted in several other positions but all within the scope of this invention. The supporting arrangements and lever arms only partially shown here are similar to those shown in Figs. 4 and 5.

Fig. 7 is a sectional view of the device shown in Fig. 6.

Figure 8:
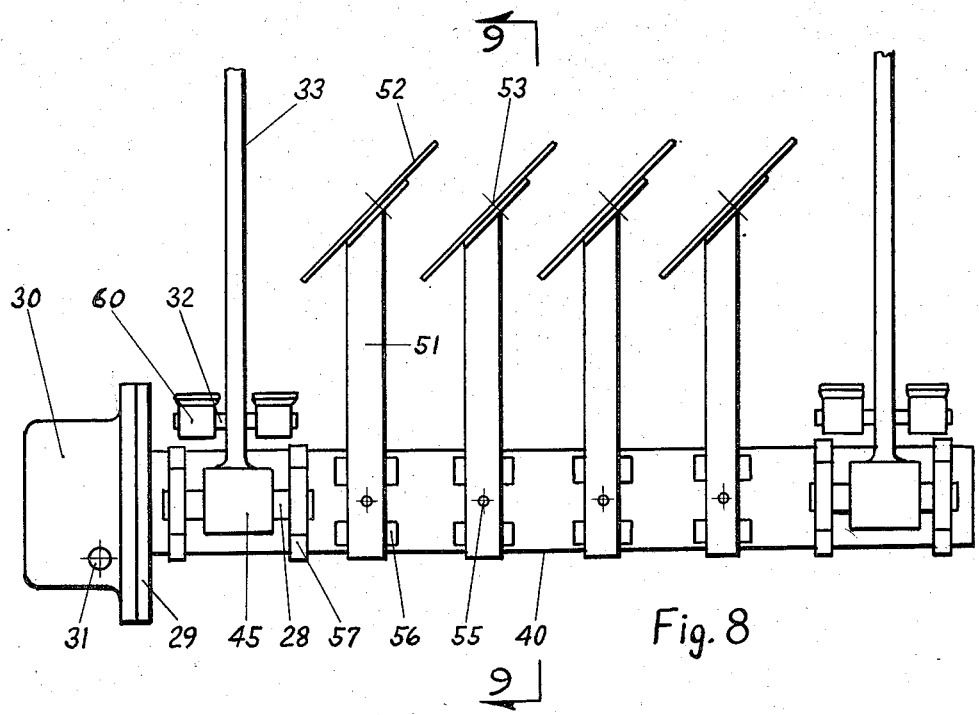
Fig. 8 is a sectional elevational view of another modification of the apparatus.

Fig. 8 is an enlarged plan view with conveyor belt 24 removed. Multiple plow type scrapers 52 are here shown fixed at 53 to spring steel strips 51 and fastened to supporting angle 40 by bolts 55 and retained in position by welded keystocks 56. Vibratory motion is transmitted from vibrator 30 to base plate 29 to cross angle 40 to spring steel strips 51 and finally to multiple plow type scrapers 52. Scrapers are suitably constructed from stainless steel sheets but not restricted to this material. The assembly is supported by bearing housings 57 and shaft 28 which in turn is carried by vibration dampener 45 and resilient cushion 46. Lever arms 33 carry the load through fixed pivot 32. Quadrant 59 permits manual position adjustment of scrapers 52 and pressure adjustment against conveyor belt 24.

Figure 9:
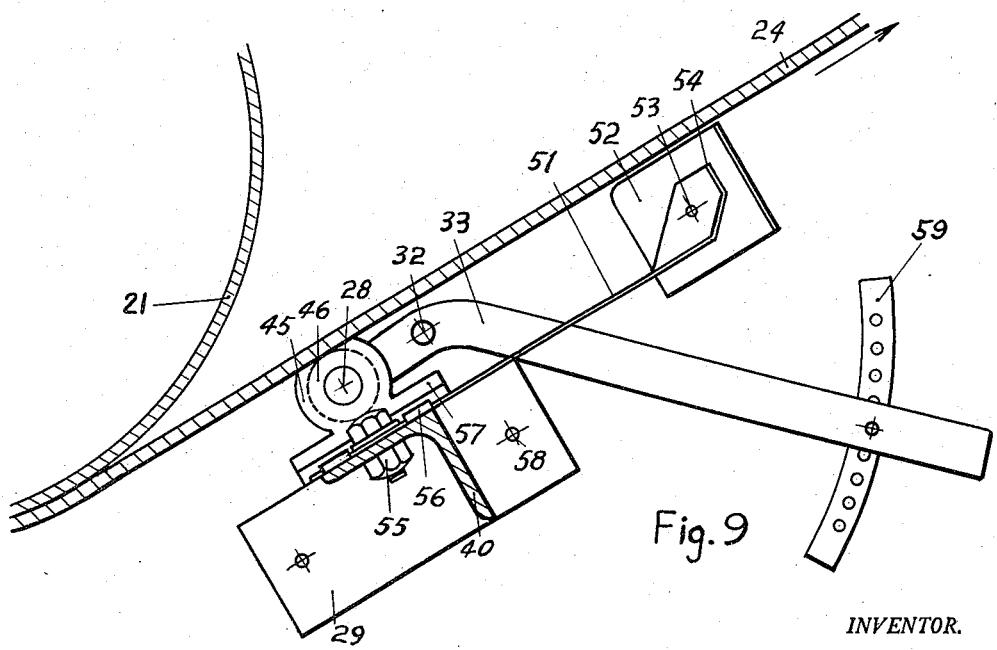
Fig. 9 is a sectional view taken along line 9—9 on Fig. 8.

Fig. 9 is a sectional elevation of the device shown in Fig. 8. Spring steel strips are bent to position 54 and fastened to scrapers 52 with square shank bolts at connection point 53. Leading edges of scrapers are rounded to pass over belt fasteners.

The vibrating belt cleaning assembly is best constructed all welded and fully annealed with any necessary detachable joints bolted with lock washers or with tack welds to lock in position. The rapid motion may be imparted by an electric vibrator or by an electric motor driven vibratory, reciprocating or oscillating mechanism or by any other suitable or convenient means. A 60-cycle power supplied electric vibrator is relatively inexpensive to purchase and install and imparts a separate rapid motion to the belt scraper of brush for approximately every one twenty-fifth ($\frac{1}{25}$") to one fiftieth ($\frac{1}{50}$") of an inch of travel of the conveyor belt thus dislodging any large or small particle adhering to the return belt. The material is jarred loose, the vibratory energy overcoming the adhesion and/or cohesion forces that retain the particles of carry over material on the belt. In prior practice substantially stationary scrapers have been used and only seldom do a satisfactory belt cleaning job. In these instances the scrapers must shear off the adhering material by the force of the belt and scraper contact frequently resulting in embedding material into the belt surface as well as into the body of many types of scrapers and brushes. This causes abrasion and erosion of both the conveyor belt and the scrapers. Rotary brushes used in prior art are relatively expensive to purchase and install, are costly to maintain due to rapid wear, are large and bulky to fit into the conveyor design, and frequently plug up with moist particles. The instant invention eliminates these disadvantages of prior art devices.

Having thus described my invention in rather full detail, it will be understood that these details need not be strictly adhered to, but that various changes and modifications will suggest hemselves to one skilled in the art, all falling within the scope of the invention as defined by the following claims:

What I claim is:

1. Apparatus for removing residual carry-over material from a belt conveyor having an operative run and a return run beneath said operative run comprising scraper means extending substantially across the full width of and operatively engaging the return run of said belt conveyor, said scraper means including supporting means maintaining said scraper means in yielding contact with the surface of said belt conveyor to assure constant engagement thereof with said surface, and vibratory means carried by said scraper means for imparting rapid vibration to said scraper means.

2. The apparatus as in claim 1 including vibration damping means interposed between said scraper means and said supporting means.

3. The apparatus as in claim 2 wherein said scraper means comprises at least one wire in tension and mounting means retaining the ends of said wire and maintaining it in tension.

4. The apparatus as in claim 2 wherein said scraper means comprises at least one blade extending generally transversely of the conveyor and mounting means for said blade.

5. The apparatus as in claim 2 wherein said scraper means comprises at least one brush extending generally transversely of the longitudinal axis of the conveyor and mounting means for said brush.

6. The apparatus as in claim 2 wherein said scraper means comprises a plurality of juxtaposed obliquely directed blades and mounting means for said blades.

7. Apparatus for removing residual carry-over material from a belt conveyor having an operative run and a return run beneath said operative run comprising a scraper assembly including scraper means extending substantially the full width of said belt in operative engagement with the return run of said belt and a mounting member for said scraper means, means connected to said assembly to rapidly vibrate the same, means for supporting the assembly for movement toward and away from the surface of said belt, a vibration damping connection between said assembly and its supporting means, and means associated with said supporting means for positively maintaining said scraper means in contact with the surface of said belt.

8. The apparatus as in claim 1 wherein said vibratory means imparts vibration to the scraper means in a direction parallel to the surface of the belt.

9. Apparatus for removing a residual carry-over material from a belt conveyer having an operative run and a return run beneath said operative run comprising a belt scraper extending substantially across the full width of said belt conveyer, means supporting said scraper for movement toward and away from said surface of said belt conveyer and yieldably urging same into operative engagement with the return run of said belt conveyer and vibratory means carried by said supporting means for movement with said scraper toward and away from said surface.

10. Apparatus for removing residual carry-over material from a belt conveyer having an operative run and a return run beneath said operative run comprising a scraper supported beneath and extending linearly across and in engagement with the surface of the return run of said conveyer, transversely to the conveying movement of the conveyer, means so supporting said scraper, and vibratory means carried by said supporting means and imparting vibration to the scraper parallel to the conveyer surface and transversely to the conveyer movement.

References Cited in the file of this patent

UNITED STATES PATENTS

| | | |
|---|---|---|
| 1,141,861 | Bausman | June 1, 1915 |
| 1,633,216 | Lakeman | June 21, 1927 |
| 1,875,442 | Greg | Sept. 6, 1932 |
| 2,624,474 | Hapman | Jan. 6, 1953 |
| 2,681,137 | Davis | June 15, 1954 |